Aug. 4, 1970

E. C. WHITNEY 3,523,203

HOUSING AND SUPPORT STRUCTURE FOR LARGE, VERTICALLY
DISPOSED ROTATING MACHINES
Filed Jan. 18, 1968

WITNESSES
Theodore F. Wrobel
E. Strickland

INVENTOR
Eugene C. Whitney
BY F. R. Lyle
ATTORNEY

United States Patent Office
3,523,203
Patented Aug. 4, 1970

3,523,203
HOUSING AND SUPPORT STRUCTURE FOR LARGE, VERTICALLY DISPOSED ROTATING MACHINES
Eugene C. Whitney, Pittsburgh, Pa., assignor to Westinghouse Electric Corporation, Pittsburgh, Pa., a corporation of Pennsylvania
Filed Jan. 18, 1968, Ser. No. 698,975
Int. Cl. B61f 17/00; F16c 1/24, 13/02, 33/66
U.S. Cl. 310—91                  5 Claims

ABSTRACT OF THE DISCLOSURE

A housing and support structure for a vertically mounted rotating machine, the structure comprising a gas tight tank having a side wall divided into sections by beams extending the length thereof, and extending radially inside and outside of the tank. The structure further comprises a concrete wall formed by pouring concrete in a space defined the walls of the tank, the walls of a pit provided in the ground and the beams extending outside of the tank. The machine is vertically disposed within the tank and suitably supported therein, for example between beam portions extending inside of the tank.

BACKGROUND OF THE INVENTION

Figure 1:
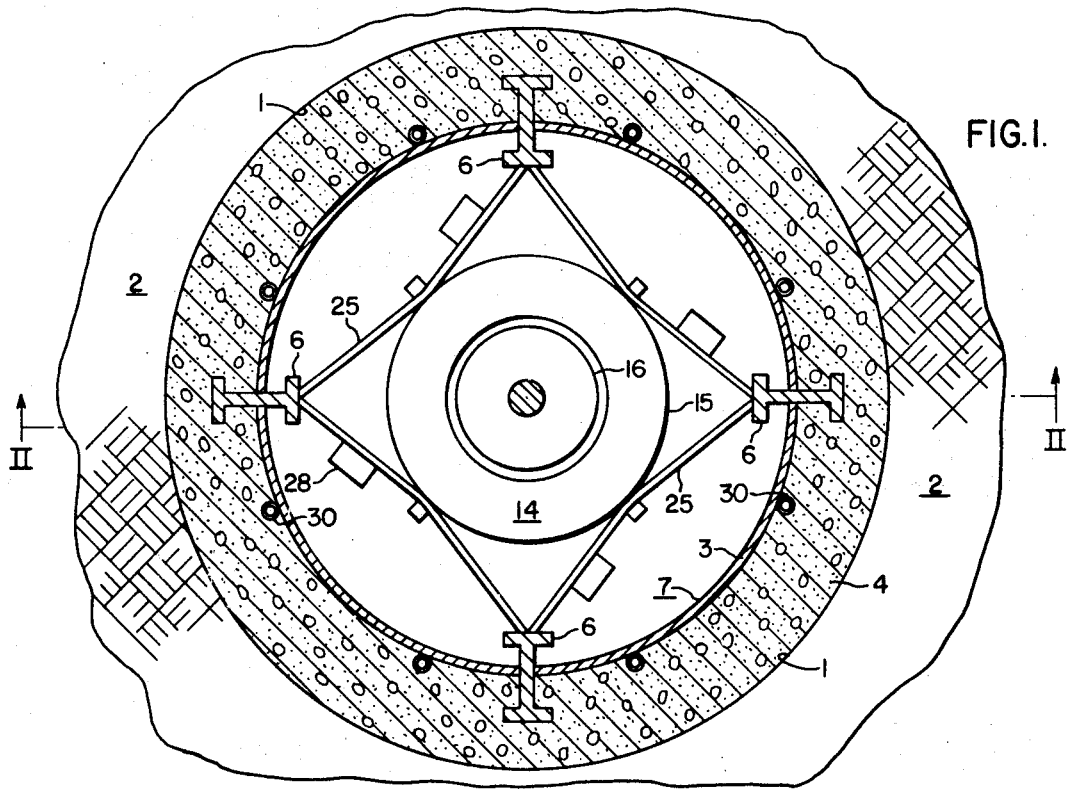

The invention relates to housing structures for large rotating or dynamoelectric machines, and particularly to structures for housing large synchronous condensers designed to be vertically disposed within the housing structure for disposition in the ground or earth.

Synchronous condensers are typically large, horizontally disposed rotating machines which are fabricated and assembled in the shop and then shipped to the customer as a single, complete unit. However, to build machines with the increasing kva. ratings, it is necessary to further increase the physical size of the machines and to cool the machines with a cooling fluid, for example hydrogen gas. Gas cooling requires a gas tight housing structure or tank enclosing each machine that is capable of withstanding relatively high explosion pressures, for example 100 p.s.i. with hydrogen gas.

The increased physical size of large kva. synchronous condensers and condenser housings is making it impossible to ship the condensers as single units because of the limited ize of the transporting means, namely, railroad cars, and the limited clearances of railroad bridges, viaducts, tunnels and platforms.

BRIEF SUMMARY OF THE INVENTION

The invention comprises a gas tight tank which may be shipped in parts and conveniently assembled at the site of the condenser installation, and a concrete wall formed in a space defined by the walls of the tank and the walls of a pit or hole provided in the ground. The tank is provided with beams extending lengthwise of the tank and radially from the side wall of the tank. The side wall of the tank is formed from wall sections disposed between the beams and attached to the side or faces of the beams in a suitable, gas tight manner. The tank is disposed vertically in the pit, and the concrete wall formed around the tank by pouring concrete in the space between the tank and pit walls thereby employing said walls as a form. The stator and rotor of the condenser are vertically mounted in the tank, the stator being suitably secured in the tank, for example, between beam portions extending inside of the tank. Before the pouring operation, small, perforated pipes may be spaced about the outside surface of the tank wall with one end thereof exposed above ground level for detecting and localizing gas leaks in the tank, and for preventing gas pressure accumulation in the concrete or in the earth around the concrete.

With the above briefly decribed structure, the tank can be shipped in sections thereby substantially increasing shipping limits and permitting larger kva. condensers to be built. The concrete and earth around the tank makes it possible to use thinner gauge metal in constructing the tank, and smaller joints with the beams while simultaneously providing an explosion resistant housing. The earth and concrete housing further muffle the sound of the operating condenser so that the installation is acceptable in residental areas. Other advantages include less mounting floor space since the machine and tank are vertically mounted, and no necessity for shifting the rotor horizontally to obtain access to the rotor and stator; simple use of a portable crane or an A-frame hoist or jacks can easily handle the components for purposes of assembly and dismantling.

THE DRAWING

Figure 2:
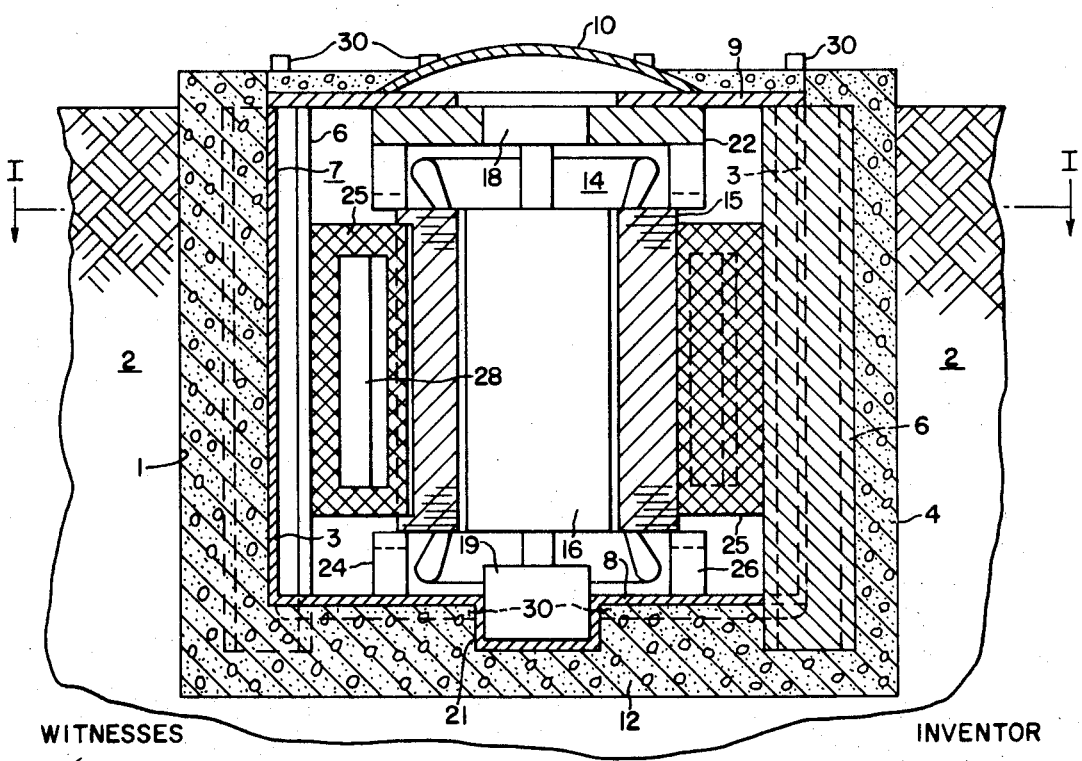

The invention will be more apparent upon consideration of the following detailed description in connection with the accompanying drawing in which:

FIG. 1 is a top sectional view of a housing structure for a large, vertically disposed rotating machine constructed in accordance with the principles of the invention; and FIG. 2 is a vertical sectional view of the structure of FIG. 1 taken along line II–II.

PREFERRED EMBODIMENT

Specifically, in the drawing, a pit or hole 1 is found in the ground or earth, generally designated 2, for receiving a housing structure including a thin inner wall 3, preferably of metal, and an outer wall 4 of concrete. The inner wall 3 is shown divided into floor (in this instance) arcuate sections by four I-beams 6 having an outer portion embedded in the concrete, and an inner portion extending into the area enclosed by the wall 3 as best seen in FIG. 1 of thedrawing.

The inner wall 3 may form a cylindrical shaped side wall of a tank structure generally designated 7 having a bottom wall portion 8, a top wall portion 9 and a removable cover 10.

The beams 6 are shown extending the length dimension of the side wall 3, and into a platform or slab 12 of concrete supporting the tank structure beneath the bottom wall portion 8 thereof.

Inside the tank structure 7 is vertically disposed a rotating machine such as a synchronous condenser, generally designated 14, the machine having a stator 15 and a rotor 16 only representatively shown in the figures.

The rotor 16 is suitably supported by upper and lower guide bearing arrangements 18 and 19 respectively, the bearing arrangements being only representatively shown in FIG. 2. The lower bearing arrangement 19, which may include a thrust bearing, is supported in a centrally located, recessed portion 21 provided in the lower wall portion 8 of the tank 7 and in the platform 12. The upper bearing arrangement 18 is shown supported by a flanged member 22 attached to the top wall portion 9 of the tank and/or to the stator 15, the flanged member encircling the bearing arrangement and the upper end turns of the winding of the stator 15.

The stator 15 is centrally, vertically mounted in the tank 7, and rests on an end turn and frame accommodating support member 24 (FIG. 2) provided on the bottom wall portion 8 of the tank. The stator is torsionally and laterally supported by structures 25 extending between the beams 6 and periphery of the stator, and suitably attached to the beams and stator.

Access to the lower portion of the machine 14 and the lower bearing arrangement 19 is provided by a crawl space or spaces 26 provided in the support member 24.

The stator supporting structures 25 are preferably open sufficiently to allow suitable flow of a cooling gas about the stator, and through cooling devices 28 only diagrammatically shown. Thus, as shown in FIG. 2, the supporting structures 25 are depicted as webbed structures which permit the free flow of the cooling gas therethrough while simultaneously providing a high strength lateral and torsional support for the stator.

The cooling devices 28, which generally comprise gas to liquid cooling means, may be supported on the webbed structures 25 as shown, or they may be otherwise suitably located within the tank 7.

With the structural arrangement thus far described, the shipping and installation problems attendant with increasingly large kva. synchronous condensers, as outlined earlier, are eliminated. The wall sections 3 comprising the side wall of the tank 7 can be shipped as sections to the site of the installation and then assembled in a suitable manner.

In constructing the housing and support structure described above, the pit 1 is dug at the site of the installation, and the concrete platform 12 of suitable thickness poured in the bottom. Before or immediately after the concrete is poured, while it is still wet and soft, small perforated pipes 30 may be placed in a position in the pit to engage the bottom and side wall structures of the tank 7, for example, as shown in the figures. The perforations are suitably shielded to prevent entry of the wet concrete.

As seen in FIG. 1, the vertical portions of the pipes 30 are circumferentially spaced about and against the outside surface of the tank side wall 3 with the one end of each pipe extending to an above ground level as best seen in FIG. 2.

The lower ends of the beams 6 can next be positioned in the wet concrete and the bottom wall portion 8 of the tank 7 with its recessed (bearing support) portion 21 placed over the concrete before the concrete sets (hardens) so that the recessed portion can settle into the still soft concrete. A housing, or a portion of the lower bearing arrangement 19 may, at this time, be disposed in the recess 21, depending upon the type of bearings used.

The side wall sections 3 are next disposed in place and joined to the bottom wall 8 and to the beams within the pit 1 in a gas tight manner, for example, by welding. The welding operation may be performed inside or outside of the tank 7 or both if sufficient space is provided between the tank side wall 3 and the side wall of the pit 1. Also, the beams 6 and wall portions 3 and 8 may be joined together outside of the pit and then lowered therein as a unit.

After the welding or joining operation between the wall portions 3 and 8 and the beams 6 is completed and suitably fixed within the pit 1, the concrete wall structure 4 can be poured about the tank 7 and the outside portions of the beams 6 (and the pipes 30) using the tank side wall and the wall of the pit 1 as the form.

When the wall 4 is poured, the vertical portions of the pipes 30 and the outside portions of the beams 6 will be embedded therein as best seen in FIG. 1. In this manner the side wall sections 3 of the tank 7 are firmly reinforced by the concrete, by the earth 2 about the concrete and by the beams 6, the outside portions of which are securely held in the concrete. For this reason the wall portions 3 and 8 may be relatively thin with the welds or joints therebetween and between the beams and walls being relatively light while simultaneously providing an explosion resistant housing.

The embedded pipes 30 provides a means for detecting and localizing gas leaks in the tank 7. Any gas escaping from the tank will find its way into one of the pipes to escape to the surface of the ground where it can be detected and collected. The embedded pipes also permit gas to escape so that gas will not accumulate around the tank and the tank wall structure.

The stator 15 of the synchronous condenser 14 is lowered into the tank 7 to rest on the support member 24. The lateral support structures 25 are then suitably secured to the stator and to the beams 6 to support the stator in a lateral, torsional manner.

The rotor 16 of the condenser 14 is next lowered into the center of the stator 15 with the lower bearing arrangement 19 being seated on or in the depression 21 provided in the bottom wall portion 8 of the tank 7.

The top wall 9 of the tank 7 with its bearing support member 22 is next disposed in place over and around the upper bearing arrangement 18, the peripheral portions of the wall 9 then fixed in sealing engagement with the side wall sections 3 of the tank. The support member 22 may be fastened to the stator 15 to assist in strengthening wall 9 against gas explosion pressure.

If the top wall 9 is provided with an opening, as shown, the cover 10 is disposed thereover and sealed thereto in a suitable manner. The tank 7 is now ready to receive and hold a suitable cooling fluid.

It should now be apparent from the foregoing description that a rugged, gas tight housing structure for large rotating machines has been provided. By using housing sections, larger kva. machines are practical and their housings conveniently shipped unassembled to be assembled at the site of the machine installation. In the present disclosure, the housing sections are joined to vertically extending beams to form a gas tight tank structure which simultaneously functions as a form (in cooperation with the walls of pit provided in the ground) for pouring a reinforced concrete wall around the tank structure. The concrete greatly strengthens the tank walls, which now can be relatively thin, while simultaneously providing an explosion resistant housing for holding a cooling fluid under high pressure. Further, by vertically disposing a machine in the ground, less floor space is needed, and the noise of the machine is muffled making it more desirable for residential locations.

Though the invention has been described with a certain degree of particularity, changes may be made therein without departing from the spirit and scope thereof. For example, other beam types than I-beams could be used in the side wall structure of the invention. Similarly, the number of beams and side wall sections may be other than four, and the beams need not extend through the tank side wall as shown. For example, separate beam portions may be attached to the inner and outer surfaces of the side wall, and the wall sections 3 attached to face or edge portions of the beam portions adjacent the side wall sections.

What is claimed is:

1. A housing structure for a vertically mounted dynamoelectric machine having a stator and rotor, the structure and machine to be disposed in a pit provided in the ground, the housing comprising a gas tight tank for enclosing the machine, the tank having a side wall comprising a plurality of wall sections extending between and joined to a plurality of beams to form a tubular shaped structure, the beams extending lengthwise thereof, the beams further extending in a radial direction from the side wall so that the beams have an outer portion lcated outside of the tank, an annular space defined by the side wall of the tank and the wall of the pit, a concrete wall formed in said space and about the portions of beams outside of the tank, means inside the tank for supporting the stator of the machine, and a cover for engaging the top end of the tank in a sealing manner.

2. The structure recited in claim 1 including a fluid contained within the gas tight tank for cooling the dynamoelectric machine, and means for cooling the fluid within the tank.

3. The structure recited in claim 1 including a cooling gas contained within the gas tight tank and maintained under pressure, perforated pipes disposed in the concrete wall and adjacent the side wall of the tank with ends extending to the top, exposed surface of the concrete wall.

4. The structure recited in claim 1 in which the beams exend through the side wall of the tank, and the side wall sections are joined to the sides of the beams.

5. The structure recited in claim 1 in which the beams have portions extending radially inside of the tank, and the stator supporting means inside of the tank including means for securing the stator to the beam portions inside of the tank.

References Cited

UNITED STATES PATENTS

| 2,107,819 | 2/1938 | Faber | 310—157 |
| 2,792,505 | 5/1957 | Baudry | 310—157 |
| 3,023,329 | 2/1962 | Kamphaus | 310—91 |
| 3,159,354 | 12/1964 | Yartz | 310—157 |

FOREIGN PATENTS 175,299  6/1953  Austria.

MILTON O. HIRSHFIELD, Primary Examiner

R. SKUDY, Assistant Examiner

U.S. Cl. X.R.

310—52, 89, 157; 165—47, 107